(12) United States Patent
Russell et al.

(10) Patent No.: US 8,396,471 B2
(45) Date of Patent: Mar. 12, 2013

(54) MOBILE SWITCHING CENTRE HANDOVER

(75) Inventors: Nick Russell, Newbury (GB); Peter Wild, Dusseldorf (DE)

(73) Assignee: Vodafone Group PLC, Newbury, Berkshire (GB)

( * ) Notice: Subject to any disclaimer, the term of this patent is extended or adjusted under 35 U.S.C. 154(b) by 712 days.

(21) Appl. No.: 12/310,255

(22) PCT Filed: Aug. 20, 2007

(86) PCT No.: PCT/GB2007/003165
§ 371 (c)(1),
(2), (4) Date: Oct. 2, 2009

(87) PCT Pub. No.: WO2008/020235
PCT Pub. Date: Feb. 21, 2008

(65) Prior Publication Data
US 2010/0062751 A1   Mar. 11, 2010

(30) Foreign Application Priority Data
Aug. 18, 2006   (GB) .................................. 0616488.3

(51) Int. Cl.
*H04W 4/00* (2009.01)
(52) U.S. Cl. ..................................... 455/432.1; 455/433
(58) Field of Classification Search ............... 455/432.1, 455/413, 417, 422.1, 433, 435.1, 435.2, 436–442
See application file for complete search history.

(56) References Cited

U.S. PATENT DOCUMENTS

| | | | |
|---|---|---|---|
| 5,862,481 A * | 1/1999 | Kulkarni et al. | 455/432.2 |
| 5,915,220 A | 6/1999 | Chelliah | |
| 6,775,546 B1 * | 8/2004 | Fuller | 455/445 |
| 7,171,219 B2 * | 1/2007 | Hu | 455/456.5 |
| 2001/0051518 A1 | 12/2001 | Lee | |
| 2002/0068578 A1 | 6/2002 | Agarwal et al. | |
| 2008/0004014 A1 * | 1/2008 | Palviainen | 455/435.1 |

FOREIGN PATENT DOCUMENTS

| | | |
|---|---|---|
| EP | 0 969 685 A2 | 1/2000 |
| EP | 1 150 529 A1 | 10/2001 |
| KR | 2002-0027420 | 4/2002 |
| KR | 2003-0073627 | 9/2003 |

(Continued)

OTHER PUBLICATIONS

"Digital cellular telecommunications system (Phase 2+); Universal Mobile Telecommunications System (UMTS); Super-Charger technical realization; Stage 2 (3GPP Ts 23.116 version 6.0.0 Release 6); ETSI TS 123 116" ETSI Standards, European Telecommunications Standards Institute, Sophia-Antipo, FR, vol. 3-CN2; 3-CN4, No. V600, Dec. 2004, XP014027496 ISSN: 0000-0001.

(Continued)

*Primary Examiner* — Brandon Miller
(74) *Attorney, Agent, or Firm* — Muirhead and Saturnelli, LLC

(57) ABSTRACT

Retaining contact data for a subscriber to a mobile communication network may be provided by a method and apparatus components therefor that allow for storing contact data for subscribers to a mobile network located within an area served by a mobile switching center, receiving confirmation at the mobile switching center (MSC) that a subscriber has left the area, updating the contact data to identify that the subscriber has left the area, and retaining at least part of the contact data, the retained part of the contact data containing call forwarding details for the subscriber.

18 Claims, 8 Drawing Sheets

FOREIGN PATENT DOCUMENTS

| | | |
|---|---|---|
| KR | 2006-0103389 | 9/2006 |
| WO | WO 97/44945 | 11/1997 |
| WO | WO0130101 A1 | 4/2001 |
| WO | WO 2007/039277 A1 | 4/2007 |

OTHER PUBLICATIONS

"Digital cellular telecommunications system (Phase 2+); Universal Mobile Telecommunications System (UMTS); Location management procedures (3GPP TS 23.012 version 6.4.0 Release 6); ETSI TS 123 012" ETSI Standards, European Telecommunications Standards Institute Sophia-Antipo, FR., vol. 3-CN2; 3CN4, No. V640, Jun. 2006, XP014034196 ISSN 0000-0001.

"Digital cellular telecommunications system (Phase 2+); Universal Mobile Telecommunications System (UMTS); Mobile Application Part (MAP) specification (3GPP TS 29.002 version 6.14.0 Release 6); ETSI TS 129 002" ETSI Standards, European Telecommunications Standards Institute, Sophia-Antipo, FR, vol. 3-CN2; 3-CN4, No. V6140, Jun. 2006, XP014035629 ISSN: 0000-0001.

* cited by examiner

MOBILE SWITCHING CENTRE HANDOVER

TECHNICAL FIELD

This application relates to storage of data relating to a mobile communication device and subscriber after a mobile switching centre handover, and in particular to when the handover occurs during a call set up.

BACKGROUND OF THE INVENTION

In mobile networks, geographic regions are divided into cells where each cell covers a particular area. Network coverage is provided within the cell by a base station (BTS) which is an antenna which transmits and receives radio broadcasts for the network. Each BTS is connected to a Base Station Controller (BSC), which in turn is connected to a Mobile services Switching Centre (MSC) or "exchange" as it is called in a fixed line telephony network. Mobile communication devices within the cell communicate with the network by transmitting signals to the base station which are then routed through the MSC associated with that base station and on to their destination. A MSC can be connected to multiple base stations.

Each MSC has a visitor location register (VLR). The VLR stores the subscriber record of all mobile devices which are currently located within the cells of the BTSs that the MSC serves. The subscriber record includes details of the subscriptions and services associated with the device such as MSISDN (telephone number), IMSI, telephony details, SMS details, GPRS details, location information, forwarding parameters, call barrings etc. The MSC/VLR is provided with this subscriber record from the subscriber's HLR (Home Location Register), which is associated with the network to which the device/subscriber is registered, when the device first enters a cell served by the MSC. The HLR stores the subscriber record of all subscribers to the network along with details of the MSC serving the subscriber at that time.

While a mobile communication device is switched on, it is constantly transmitting signals to the network. When the device moves into a cell served by a different MSC/VLR, that cell and MSC/VLR will receive a signal from the communication device for the first time At this stage the device is not registered with the MSC/VLR and so the MSC/VLR does not hold a subscriber record for that mobile device. This results in the MSC/VLR not recognizing the mobile device. The signals from the mobile device include data which identify the subscriber and provide information about the subscriber's home network and its home location register (HLR). The MSC/VLR, on detecting the new mobile device in one of its cells, attempts to register the subscriber. Registration is implemented by the new MSC/VLR by extracting the subscriber and HLR identification data from the signal from the mobile device. The MSC/VLR contacts the subscriber's HLR to indicate that the subscriber has entered one of its cells and to request the subscriber's subscriber profile. In response, the HLR records the details of the new MSC/VLR in which the subscriber is located and uploads the subscriber's subscriber profile to the new MSC/VLR. The HLR also informs the MSC/VLR in which the device was previously located that the device has left is cells and that the subscriber's subscriber profile should be deleted. Thus the subscriber profile of the subscriber is only held by a single VLR (the VLR associated with the cell in which the subscriber is currently located). The process of registering with a new MSC is known as inter MSC handover.

Systems have been proposed in which at least part of the subscriber profile is retained on the old MSC/VLR in an inactive state for a predefined time period after the MSC has received an instruction from the HLR to delete the subscriber profile In such systems, if a subscriber returns to a MSC which it has recently left and its profile is retained in inactive form, the HLR only needs to transmit an instruction to reactivate the subscriber profile rather than transmit the entire subscriber profile. Such systems aim to reduce the regularity at which entire subscriber profiles are transmitted between MSCs and HLRs in order to reduce the consumption of bandwidth between these network components.

When a user attempts to make, a call to a called (target) subscriber, the call first arrives at the Gateway MSC (GMSC) of the called subscriber's home network, which takes on responsibility for routing the call to the current location of the subscriber. The GMSC interrogates the HLR (also in the subscriber's home network) for the location of the target subscriber. This is to identify the location of the target subscriber/device but also to identify a routing path that it must use to connect to the MSC that is serving the target subscriber/device. The HLR returns these details to the GMSC along with a Mobile Station Roaming Number (MSRN) which has been allocated to the target subscriber by the serving MSC.

While the GMSC is retrieving the routing information, the call is held at the GMSC. The GMSC then uses this routing information to establish a communication link between itself and the MSC serving the target subscriber. The MSRN of the target subscriber is provided to the MSC in order that it can connect the incoming call to the target subscriber. It can take several seconds to set up a communication link and this time period is extended when the subscriber is roaming in places geographically far away from the home network, for example in different countries, mainly due to the distance involved and the number switching centres through which the call must be passed.

It is possible that the target subscriber may have moved to a different cell provided by a base station which is served by a different MSC/VLR during the time taken to complete the call set-up procedure from the GMSC to the MSC/VLR. In such cases the call is routed to the MSC/VLR which the called party has just left since this is the routing information that was provided to the GMSC by the HLR. This situation occurs when the target subscriber registers with a new MSC/VLR after the HLR has transmitted the details of the previous MSC/VLR and roaming number to the GMSC. In this case, the GMSC will have been advised of the previous MSC/VLR which served the target subscriber/device and will attempt to connect the call to the previous MSC.

Typically, the registration procedure is faster than the call set up procedure and this is particularly the case when the set up period is extended due to large physical distances between the GMSC and the serving MSC/VLR. Thus, by the time the GMSC has set up a communication link with the MSC/VLR, the device has registered with a new MSC/VLR and the subscriber details and MSRN will have been deleted from the old MSC/VLR at which the call has arrived. Without the MSRN and the subscriber details, the old MSC/VLR is unable to identify and to contact the subscriber or apply any call forwardings and so the call is ended. This is known as a dropped call.

The call will also be dropped in those systems in which the subscriber profile is retained in an inactive state since the inactive data will not be identified when the VLR scans its database for subscribers currently communicating through its BTSs using the received MSRN.

It is noted that it can be problematic when devices move between MSC/VLRs at the time when a call is being set up to that device. In particular, this can result in call dropping and customers not being connected to their desired contacts. This is a problem for mobile network operators.

SUMMARY OF THE INVENTION

According to embodiments of the system described herein, the problem of call dropping may be addressed by retaining the subscriber record (including the MSRN) of subscribers for a predefined time period after the subscriber has left the MSC/VLR. The subscriber profile is retained in an active state in order that it can be identified should an incoming call be received for that subscriber. Such embodiments provide the advantage that, since the MSC/VLR retains contact details for the subscriber in an active state, it is able to apply customer set call forwardings, for example forwarding to voicemail rather than allowing the call to drop.

In further embodiments of the system described herein, the MSC/VLR retains the subscriber record and MSRN in situations when the MSC/VLR has received a request for a MSRN for the subscriber and has allocated and provided that MSRN to a HLR but has not received an incoming call for that MSRN, regardless of whether it has received a subsequent request from the HLR to delete the subscriber record for that subscriber. In such embodiments, the MSC/VLR is able to identify the subscriber to whom the incoming call is directed.

In further embodiments of the system described herein, when an MSC/VLR receives a communication set up request for a subscriber which has recently left its serving cells, it contacts the HLR to obtain the current MSC/VLR routing details for the subscriber. It can then relay the incoming call to the correct MSC/VLR. Such embodiments enable the incoming call to be connected to the subscriber/device despite the fact that the call was initially routed to an MSC/VLR that no longer contains the subscriber/device.

The invention is defined in its various aspects in the appended claims, to which reference should now be made.

BRIEF DESCRIPTION OF THE DRAWINGS

Embodiments of the system described herein are now described explained with reference to the accompanying figures, in which.

DETAILED DESCRIPTION OF VARIOUS EMBODIMENTS

Figure 1:
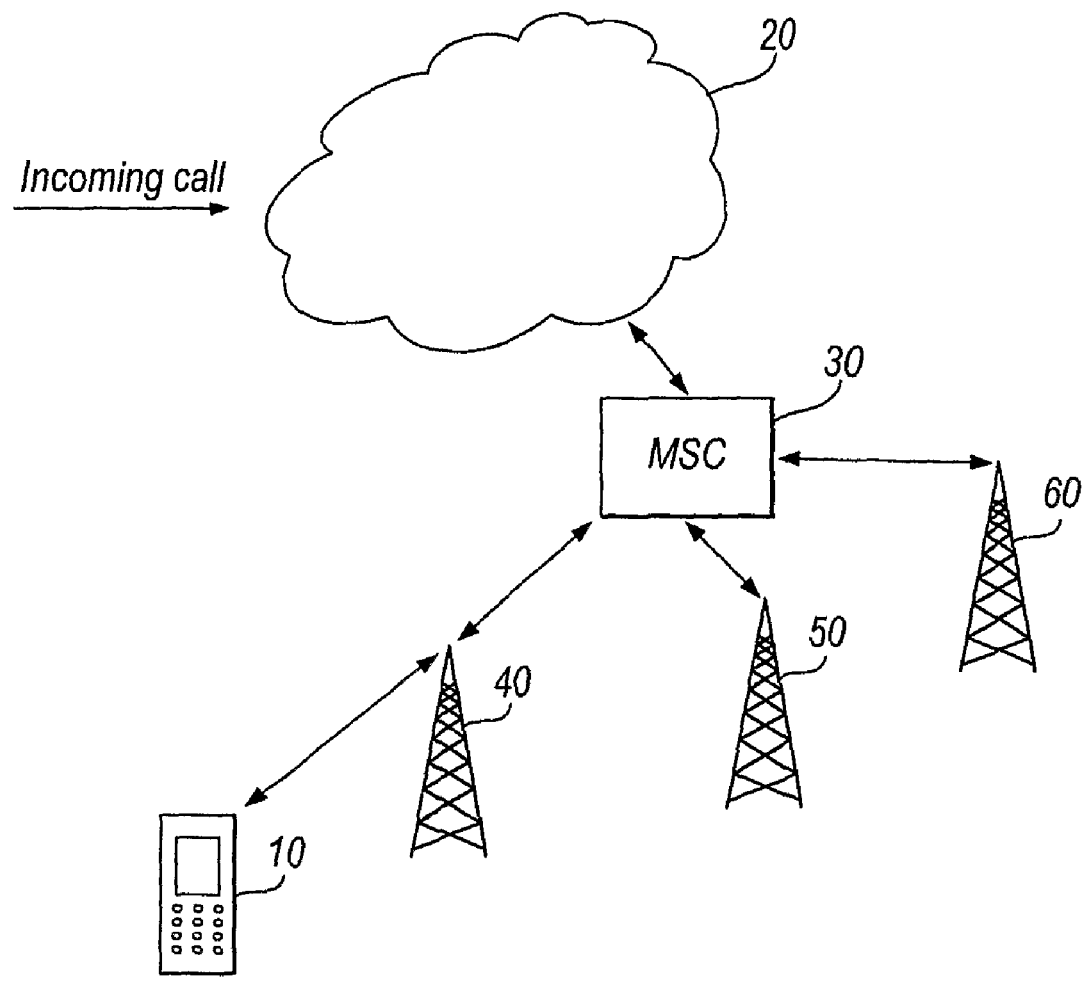
FIG. 1 is a high level diagram showing the communication path to a mobile network.

FIG. 1 shows the basic communication path to a device in a wireless network. In FIG. 1 a call is made to a mobile device 10. The call may have originated from any technology, for example fixed line, GMS etc. The network 20 routes the incoming call to the mobile switching centre 30 which serves the base station 40 with which the device 10 is currently communicating. When the call arrives at the MSC it provides the MSC with a mobile station roaming number (MSRN) associated with the target subscriber. The MSRN is used by the MSC to identify the subscriber. The MSC then connects the call to the subscriber.

Figure 2:
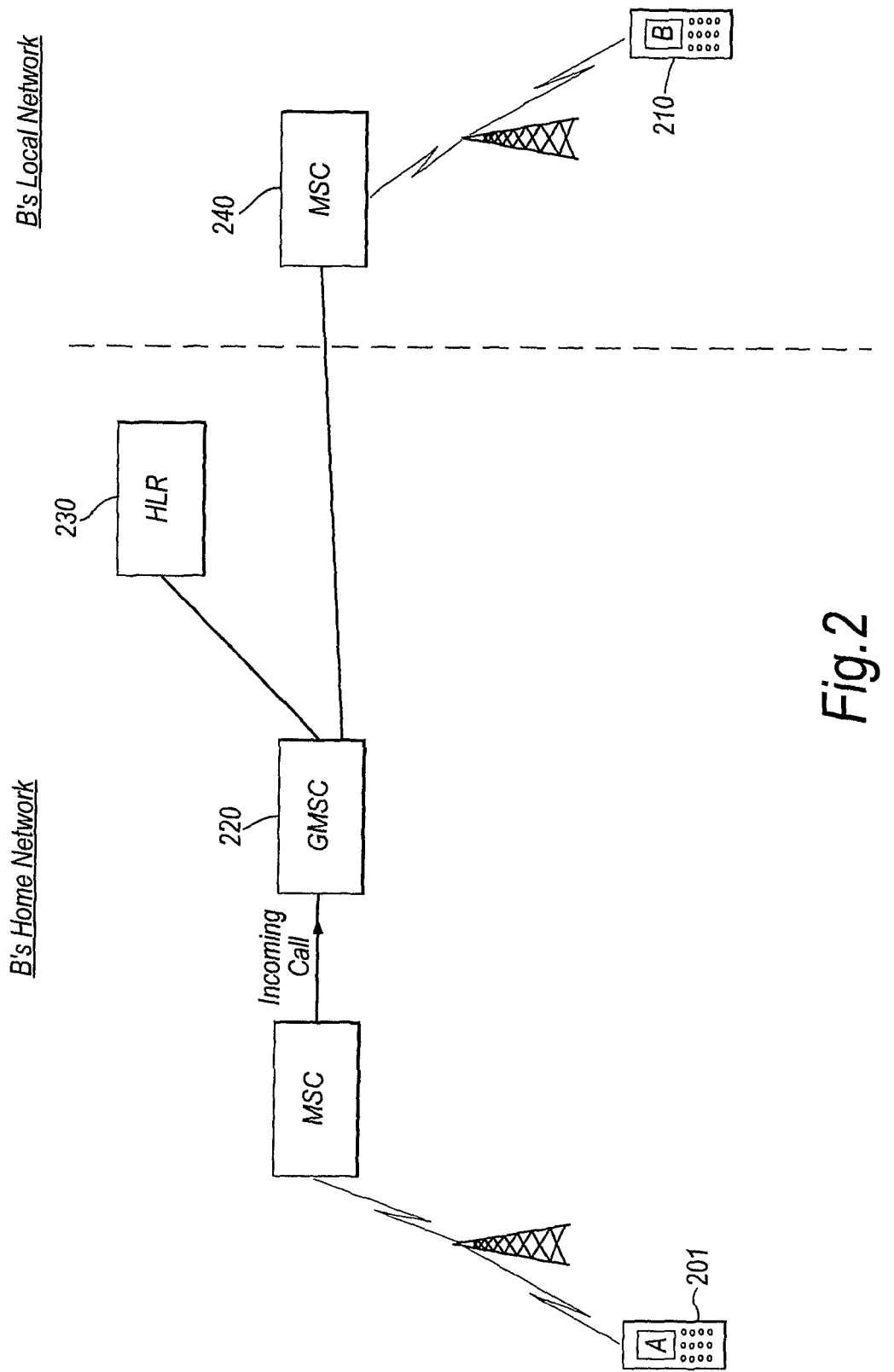
FIG. 2 shows the physical location of devices in a mobile communication system.
Figure 3:
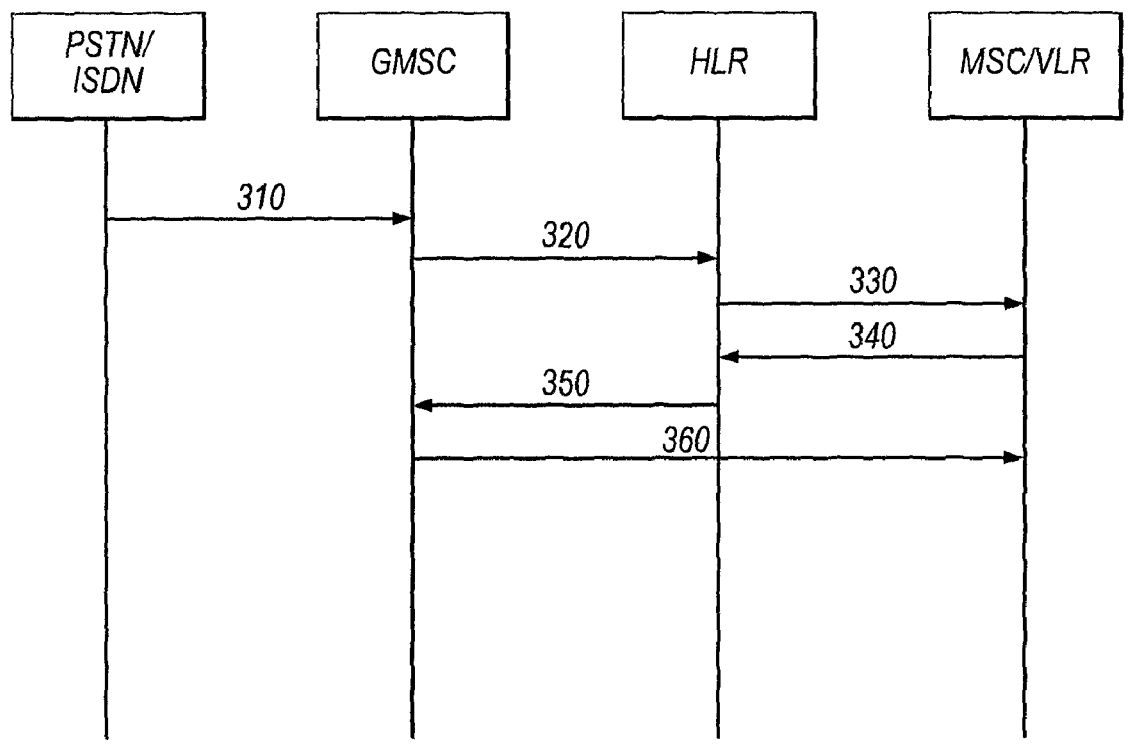
FIG. 3 is a flow diagram showing the known steps taken during call set up between devices in a mobile communication system.

FIGS. 2 and 3 show in more detail a known procedure for setting up a communication link, for example a voice call, with a mobile communication device of a subscriber. FIG. 2 shows the physical components and FIG. 3 shows the flow of messaging between the components. In the initial step, a first party (A) 201 attempts to initiate a call with device 210 of subscriber B. The call may be a voice call or any other type of communication which requires a two way circuit switched communication link to be established. Typically, this is done by party A entering the telephone number of the subscriber of subscriber B. The call is typically routed between networks using the signalling protocol ISUP (ISDN User Part). The incoming call is directed to subscriber B's GMSC 220 at step 310 and the GMSC receives the call set up request (Initial Address Message). The GMSC is typically located in the home network of the target subscriber and it is responsible for routing all incoming calls to its network's subscribers.

The GMSC must then attempt to connect the call to the MSC which is currently serving the subscriber. Each MSC is responsible for at least one BTS (Base Transceiver Station) and directs all incoming and outgoing communications to devices located within the cells of its BTS(s). In order to contact the MSC which is serving the subscriber, the GMSC must obtain the routing information for that MSC in order that it can correctly connect the call to the MSC. This routing information exists as a unique routing number associated with the MSC. The routing number is often known as Global Title which is a number including a country code, destination code and serial code for the MSC. Home Location Registers (HLRs) store the routing information for the MSCs serving each of their subscribers. This information is provided to the HLR by the MSC when a subscriber moves into an area served by a new MSC and registers with that MSC. The GMSC identifies the home location register (HLR) 230 of the subscriber 210 from the called telephone number in the ISUP. The GMSC 220 then interrogates the HLR 230 at step 320 in order to obtain the routing information for the MSC 240 that is serving the subscriber. The HLR 230 contains a record that device 210 is currently served by MSC 240 along with the routing information for MSC 240.

MSCs associate incoming calls with target subscribers by using mobile station roaming numbers (MSRNs). A MSRN is allocated to a specific subscriber for a particular call and, typically, is released when the call is ended. Thus, the MSRN is temporarily allocated to the subscriber by the MSC. Effectively, by allocating a MSRN to a subscriber, the MSC is allocating a communication channel between itself and the subscriber. Thus, any incoming call to an MSC must provide a MSRN in order that the MSC can confirm that it has allocated resource for the call, identify the target subscriber and connect the call. Typically, the MSRN includes the routing information for the MSC serving the subscriber. Therefore, the MSRN provides all necessary information for routing a call to a subscriber.

When the HLR receives a request for the MSC routing information of a subscriber for call connection purposes from the GMSC (step 320), it automatically transmits a request to MSC 240 to request that a MSRN is allocated to the subscriber 210 because there is an incoming call for that subscriber. The MSRN identifies a unique communication to the MSC 240' for the subscriber 210 for a specific call. On receipt of the MSRN request from the HLR 230, MSC 240 allocates a MSRN to the subscriber and then stores this MSRN against the subscriber profile. The subscriber profile includes various information about the subscriber including service subscription information, IMSI, MSISDN(s)/telephone number(s) allocated to the subscriber, etc. In particular, the subscriber profile contains the call forwarding details which are required to forward a call to voicemail when the subscriber is not reachable, does not accept the call, etc. The MSC transmits the MSRN back to the HLR 230 at step 340.

On receipt of the MSRN, at step 350, HLR 230 transmits to GMSC 220 the MSRN allocated to the incoming call along with the routing information for MSC 240 (this routing information may be included in the MSRN and not as separate information). At step 360, GMSC 220 uses the routing information to establish a communication link to MSC 240 and provides the MSRN to MSC 240 to enable it to identify and connect to the target subscriber's device 210. Typically, the MSRN is provided to the MSC by the MSC identifying the MSRN in the 'To' field within the incoming communication.

On receipt of the MRSN, the MSC checks the MSRN against its records. It identifies the subscriber that has been allocated the MSRN and attempts to connect the call.

Figure 4:
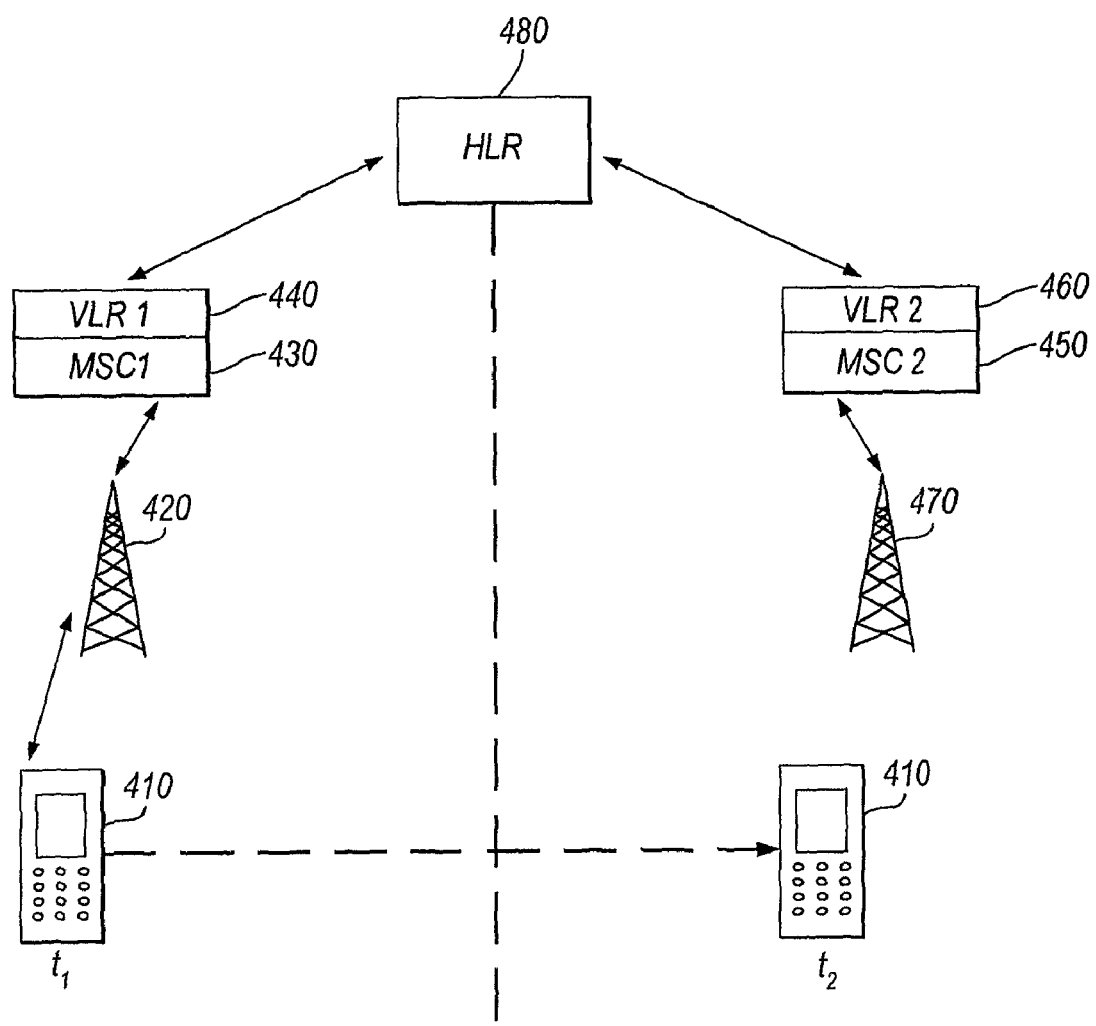
FIG. 4 shows a device moving between cells.
Figure 5:
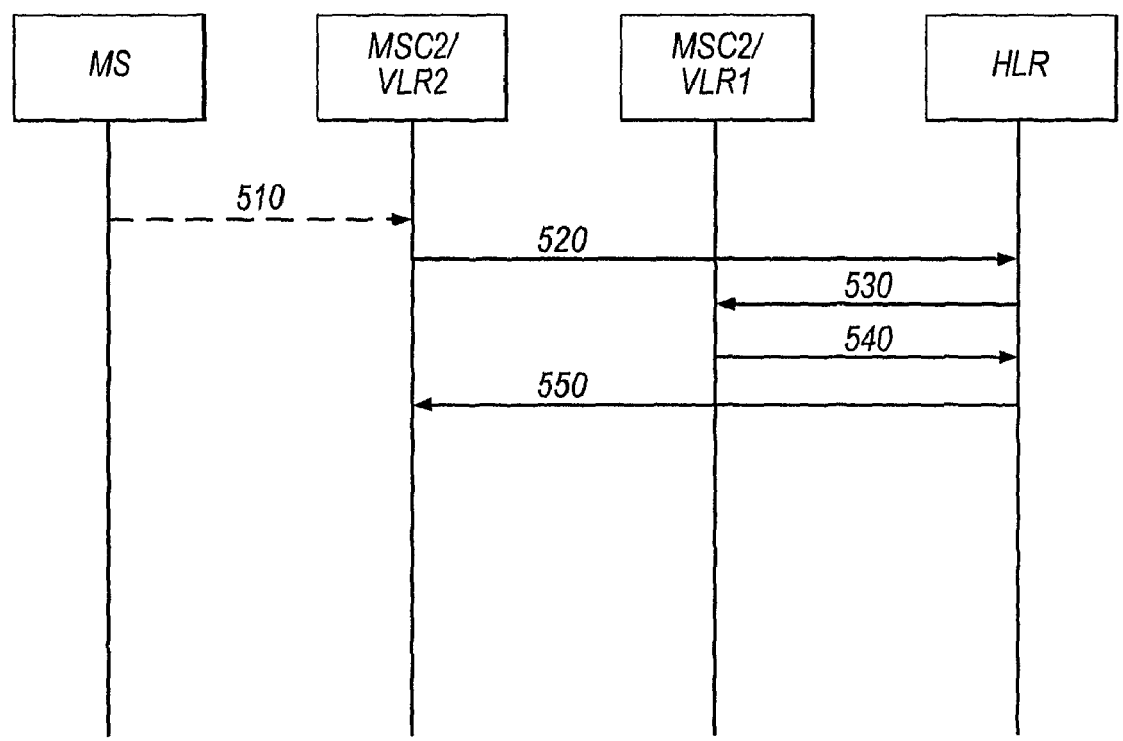
FIG. 5 is a flow diagram showing the known flow of data during a MSC handover.

FIGS. 4 and 5 show the known steps taken when a mobile communication device moves between cells and a MSC handover occurs. These figures and description describe the situation when there is no active communication link to the subscriber, i.e. the subscriber is in an "Idle" state and thus not on a call. At a first time t1 the device 410 is located in a cell which is served by a first base station 420. The MSC associated with that cell is MSC1. While the device 410 is located in the cell, its subscriber profile is stored in the location register VLR1 440 associated with MSC1 430. The VLR is a database storing the profiles of all subscribers which are currently served by its associated MSC.

At time t2, the device 410 moves into a new cell which is served by a different MSC, MSC2 450. In normal use the device monitors signal strength and quality of different cells. The decision to handover to, and start communicating via, a new cell includes a consideration of such monitoring and may be made by the network or the device itself. Once the device has moved into the new cell and wishes to handover to that cell, its regularly transmitted ID signal is received by BTS2 470 (step 510). The id transmitted by the device could be, for example, IMSI (International Mobile Subscriber Identity) or TMSI (Temporary Mobile Subscriber Identity). The ID is forwarded to MSC2 in order to check whether the device is registered with MSC2. MSC2 450 checks whether the device is registered by interrogating its VLR, VLR2 460. Since the device has only just entered the cell it is not yet registered with MSC2 and so its subscriber profile is not stored within VLR2. In order to register the device, VLR2 is required to obtain the subscriber profile for device 410. The profile from the HLR is needed to provide service to the subscriber. If the MSC/VLR has no profile, then it does not know how to identify the subscriber, how to authenticate it (i.e. make sure he is who he purports to be) and what services the subscriber is allowed to use. It may not even be able to provide the service at all e.g. it cannot perform call forwarding if it does not know what numbers to forward calls to.

The ID signal transmitted by the subscriber's device and received by BTS2 contains identification of the subscriber's home location register (HLR) 480. As discussed above, the HLR is set up and located in the subscriber's home network and includes the subscriber data of all subscribers registered with its network. At step 520, MSC2 contacts the subscriber's HLR 230 in order to obtain its subscriber profile. This transmission from MSC2 also includes data identifying MSC2 as the MSC which should now be responsible for serving the subscriber.

On receipt of the registration request from MSC2, HLR 480 identifies and retrieves the subscriber profile from its internal database and transmits this back to MSC2 at step 550. At this stage the HLR has the contact details of the subscriber's device stored and identified as MSC1, since this was the MSC responsible for the cell which covered the previous location of the subscriber. The HLR updates its location register for subscriber 410 in order to reflect its current MSC (MSC2 450) so that it is able to contact the subscriber 410 when necessary. The HLR updates its records by storing the details of MSC2 (including the routing information for MSC2) and deleting its records of MSC1. At 530, HLR 480 transmits a signal to MSC1 to confirm that device 410 is no longer located in its serving cells and that it should delete the subscriber profile for subscriber 410. This is confirmed by MSC1 at step 540.

Figure 6:
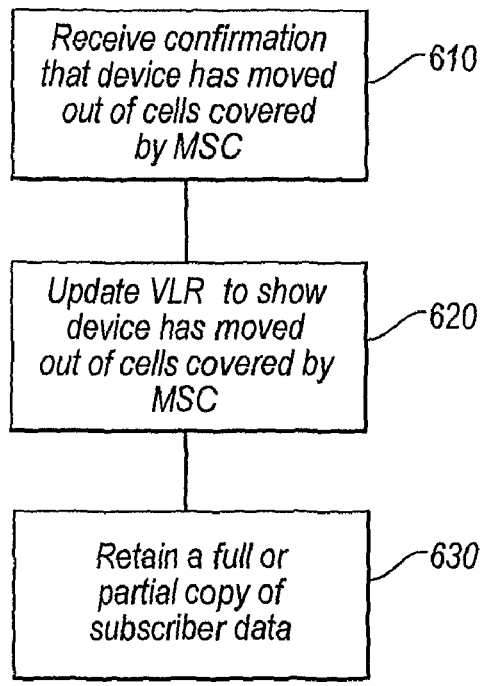
FIG. 6 shows the steps taken in an embodiment of the system described herein when an MSC receives confirmation that a device is no longer located in its cells.

FIG. 6 is a flow diagram showing the steps taken at an MSC in an embodiment of the invention when the MSC receives a transmission from a HLR indicating that a device has moved out of its serving cells. At 610 the MSC receives confirmation that a subscriber has moved out of the cells that it is serving from the subscriber's HLR. As discussed above, the HLR is sending the delete subscriber profile instruction in response to a different MSC attempting to register the subscriber. At 620 the MSC deregisters the device from its VLR by updating its records to show that the device has moved out of its served cells. However, at 630 the VLR retains a full or partial copy of the subscriber profile for the device which has just left its cells. The retained portion includes call forwarding details for incoming calls to that subscriber, for example the subscriber's voicemail number. Importantly, if a MSRN has been allocated to the subscriber by the MSC, the MSRN is retained. In certain embodiments, the subscriber profile and MSRN may be stored in a separate storage area of the VLR specifically designated for devices which have recently moved out of a cell served by that MSC. Importantly, the retained portion of the subscriber profile and MSRN are retained in an area of the VLR which is interrogated when the MSC receives a call set up request for the subscriber. Thus, if an incoming call arrives at the MSC the MSC is able to search data relating to subscribers which have recently moved out of coverage of its cells for the MSRN and identify the associated subscriber profile. The MSC can then direct the incoming call directly to the destination number (e.g. voicemail) using the call forwarding details in the subscriber profile.

In preferred embodiments, the subscriber profile is stored at the VLR for a predefined time period. This time period may be controlled and specified by the MSC/VLR.

In further embodiments of the invention, the subscriber profile is only retained if the device leaves the cell covered by a MSC in specific situations. In the preferred embodiment shown in FIG. 7, the subscriber profile and MSRN are not deleted if the instruction from the HLR to delete the profile is received by the MSC after the MSC has allocated a roaming number to the subscriber, and has provided that roaming number to the HLR, but before the MSC has received the incoming call and set up the communication link to the subscriber. In this instance, MSC is expecting to receive a communication for the device (because the HLR has requested a MSRN for that subscriber from the MSC) but the device has left its cells before that communication has been received.

Figure 7:
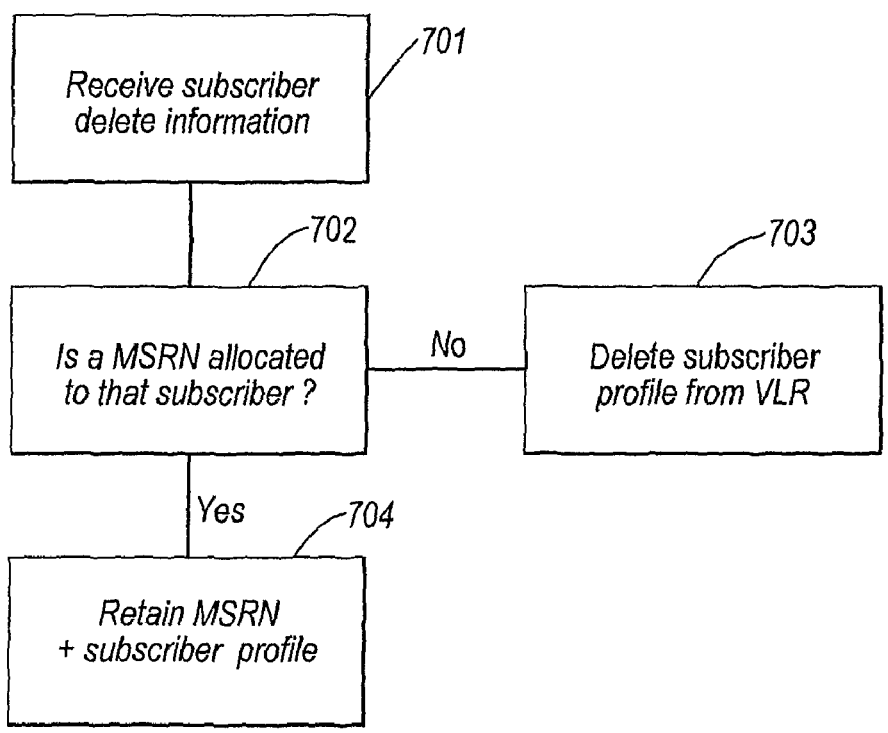
FIG. 7 shows the steps taken at a MSC in an embodiment of the system described herein.

Referring to FIG. 7, at 701 the MSC receives from a HLR an instruction to delete the subscriber profile of an identified subscriber who has recently registered with a different MSC. On receipt of the delete subscriber profile instruction the MSC checks its records of MSRNs and subscriber profiles to identify whether a MSRN has been allocated to that subscriber at 702. If no MSRN has been allocated to the subscriber, the subscriber profile is deleted from the VLR at 703. If a MSRN has been allocated to the subscriber, the MSRN and subscriber profile are retained in the VLR at 704. In further embodiments only a part of the subscriber profile is retained but the retained part is sufficient to identify the call forwarding details of the subscriber. In further embodiments the MSRN and subscriber profile may be retained for a predetermined time.

In the embodiments of FIGS. 6 and 7 if a call set up request presenting the MSRN is received by a MSC after the MSC has been notified that the device has left its cells, since the VLR retains a copy of the MSRN and the subscriber profile, the MSC is able to identify the subscriber to which the incoming call is directed. The MSC can then identify the call forwarding details from the subscriber profile and, route the incoming call to this new destination e.g. voicemail. Thus, a third party who is attempting to contact the subscriber is able to leave a voicemail for the subscriber rather than the call being dropped.

In an embodiment of the invention, if the delete request from the HLR is received after a MSRN has been allocated to the subscriber but before the associated incoming call has been received, the VLR marks the MSRN subscriber profile as one relating to a subscriber who is no longer located within the served cells of the MSC. Then, on receiving the incoming call identifying the MSRN, the MSC can retrieve the MSRN and subscriber profile but identify that this subscriber is not located in its cells. Therefore, it does not attempt to connect the call to the subscriber but, instead, forwards the call directly to the new destination number (e.g. voicemail) of the subscriber using the call forwarding details in the subscriber profile.

Figure 8:
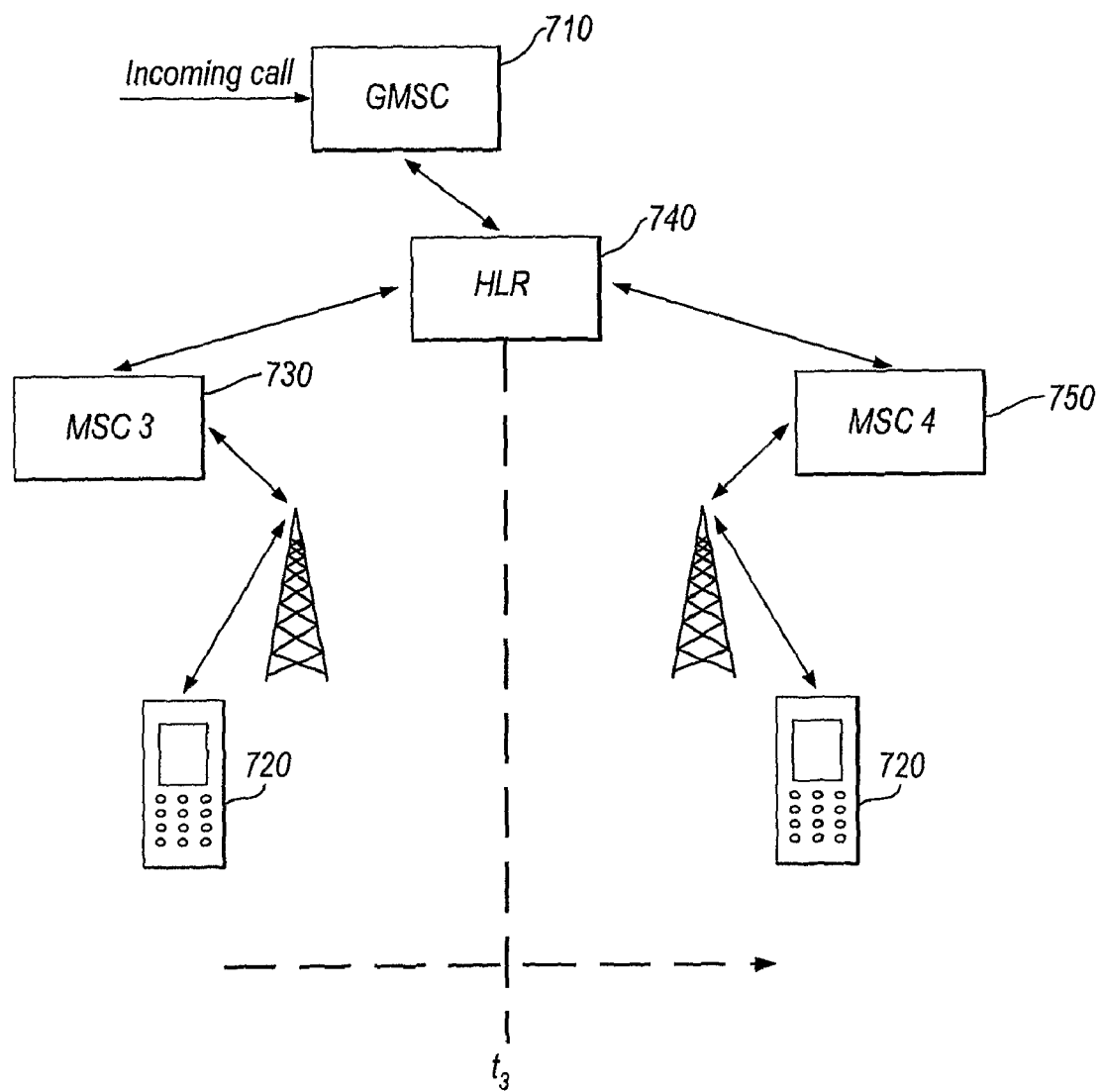
FIG. 8 shows a device moving between cells during a call set up procedure.
Figure 9:
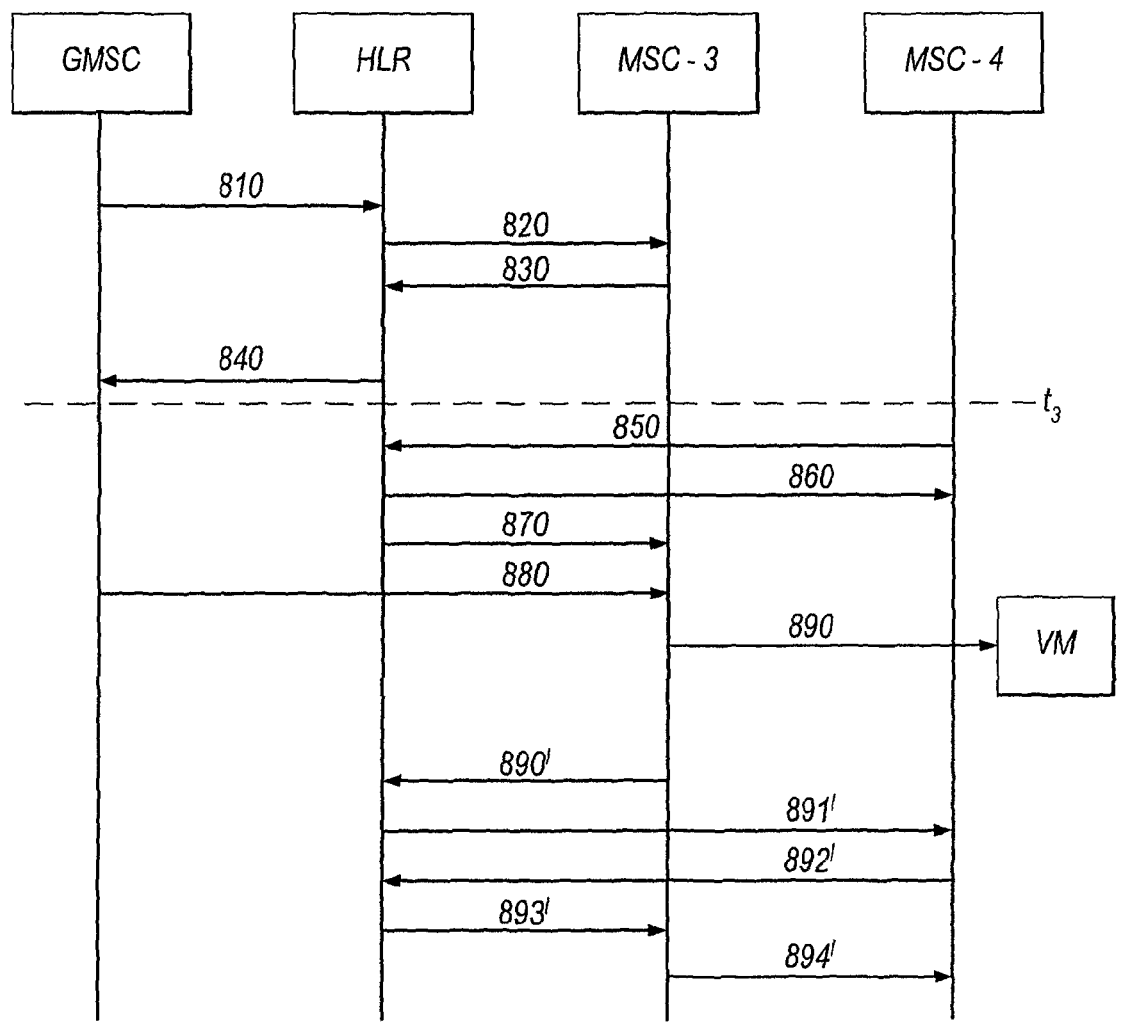
FIG. 9 is a flow diagram showing the flow of data in an embodiment of the system described herein when an MSC handover occurs during a call set up process.

FIGS. 7 and 8 show all steps of the call set up procedure in which a MSC handover occurs during call set up. FIG. 8 shows the location of the device at different times and FIG. 9 shows the flow of data and communication links between the MSCs and location register (HLR). FIGS. 8 and 9 are simplified by not showing VLRs. It should be appreciated that each MSC has an associated VLR.

Referring now to FIGS. 8 and 9, when a call initiation request is received at GMSC for subscriber 720, GMSC contacts the HLR 740 for the subscriber for confirmation of a routing path to its current MSC and a MSRN for the subscriber at step 810. HLR interrogates its records and determines that subscriber 720 is currently in a cell served by MSC3 730. At step 820, HLR transmits a request for a MSRN for subscriber 720 to MSC3 730. MSC3 730 allocates a MSRN to the subscriber 720 to enable a communication link to be set up between subscriber 720 and MSC3 730 and transmits this to the HLR 740 at step 830. The MSC stores this MSRN against the subscriber profile. HLR 740 transmits this MSRN to GMSC 710 along with the routing information for MSC3 at step 840.

At time t3, subscriber 720 moves from a cell served by MSC3 to a cell served by MSC4 750. The subscriber 720 registers with MSC4 and MSC4 contacts HLR 740 to confirm that the subscriber 720 has moved into one of its cells at step 850 and to obtain a copy of the subscriber's subscriber profile.

On receiving the signal from MSC4, HLR transmits the subscriber profile of the subscriber to MSC4 at step 860 and informs MSC3 that device 720 has moved out of its served cells at step 870. MSC3 updates its records to show that device 720 is no longer located in its served cells but retains at least a partial copy of the subscriber profile of device 720 and the MSRN that MSC3 allocated to the subscriber. The HLR updates its records to show that the subscriber is located in MSC4.

Since HLR has advised GMSC of device 720's location at step 840 before subscriber 720 had moved between MSCs, GMSC believes that subscriber 420 is in a cell served by MSC3 and, accordingly, tries to establish a communication link to MSC3 at step 880. In practice, step 880 will occur simultaneously with steps 850-870.

On receipt of the ISUP initial address message 880 and the MSRN from GMSC, MSC3 interrogates its VLR for the incoming MSRN and to identify the subscriber profile associated with this MSRN. MSC3 matches the incoming MSRN to that stored in its VLR and retrieves the subscriber profile of the target subscriber. The MSC also determines that subscriber 720 is no longer within its cells and so knows that it cannot connect the call directly to the device of the subscriber 720. However, the retained subscriber profile includes contact details for the subscriber 720 in the situation when the subscriber is not reachable. Typically this will be forward to voicemail. At step 790 MSC3 connects the incoming call to the forwarding number of subscriber 720. Additional call setup procedures then take place to forward the call to his new destination, which could even be the subscriber's voicemail box.

In further embodiments of the invention, on receiving a call set up request for a subscriber which is no longer in its served cells, the MSC reverts back to the HLR to request the current MSC of the subscriber and the required routing information. The steps taken by such embodiments of the invention are shown as 890'-894' in FIG. 9.

In such embodiments, MSC3 requests routing information for the current MSC and MSRN for subscriber 720 at 890'. Since, from time t3, subscriber 720 has registered with MSC4 and HLR has updated its register to reflect this, HLR has stored the details for MSC4. HLR then interrogates MSC4 at step 891' to request the routing information and a MSRN for the subscriber. This information is transmitted back to the HLR at step 892'.

At step 893', HLR transmits the routing information and MSRN for subscriber 720 to MSC3. Finally, at step 794', MSC3 uses the routing information and MSRN to relay the call to MSC4 and establish a communication link between GMSC and device 720. In this situation, MSC3 is routing the call onto MSC4 and the subscriber and so is acting like an GMSC.

Embodiments of the present invention provide the advantage that calls to a subscriber are not dropped in the situation where that subscriber moves between MSCs while a call set up is in progress. Instead, the calling party can either be connected to the normal forwarding number for "subscriber not reachable" (e.g. voicemail) or to the actual subscriber/device on the new MSC/VLR via the old MSC/VLR.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method for routing calls in a mobile communication network using contact data for a subscriber of the mobile communication network, the method comprising:
storing contact data for subscribers of a mobile network located within an area served by a mobile switching centre (MSC);
receiving confirmation at the MSC that a subscriber has left the area;
updating the contact data to identify that the subscriber has left the area;
retaining at least part of the contact data, the retained part of the contact data containing call forwarding details for the subscriber;
on receiving confirmation that the subscriber has left the area, determining if an incoming call is expected for the subscriber, wherein retaining at least part of the contact data is performed in dependence on the incoming call being expected for the subscriber; and
using the retained part of the contact data to forward to the subscriber the incoming call that arrives at the MSC but which is received by the MSC after the subscriber has left the area.

2. The method according to claim 1, wherein determining if the incoming call is expected for the subscriber includes determining if a mobile station roaming number has been allocated to the subscriber.

3. A method for connecting a call to a subscriber of a mobile communications network at a mobile switching centre (MSC), comprising:
receiving at a MSC a request to connect an incoming call to a subscriber;
determining whether the subscriber has left an area served by the MSC;
retaining, after the subscriber has left the area, contact data containing call forwarding details for the subscriber;
on receiving confirmation that the subscriber has left the area, determining if the incoming call is expected for the subscriber, wherein retaining the contact data is performed in dependence on the incoming call being expected for the subscriber;
retrieving the call forwarding details for the subscriber from the retained contact data for the subscriber in dependence on the subscriber having left the area; and
connecting the incoming call using the forwarding details.

4. The method according to claim 3, wherein the request includes a mobile station roaming number associated with the subscriber and wherein determining whether the subscriber has left the area is performed by identifying whether the mobile station roaming number included in the request is allocated to the subscriber and determining whether the subscriber is identified as having left the area.

5. The method according to claim 3, wherein determining if the incoming call is expected for the subscriber includes determining if a mobile station roaming number has been allocated to the subscriber.

6. A method for connecting a call to subscriber of a mobile communication network at a mobile switching centre (MSC), comprising:
receiving at a MSC a request to connect an incoming call to a subscriber;
determining whether the subscriber has left an area served by the MSC;
retaining in a storage device, after the subscriber has left the area, contact data containing current call routing information for the subscriber;
on receiving confirmation that the subscriber has left the area, determining if the incoming call is expected for the subscriber, wherein retaining the contact data is performed in dependence on the incoming call being expected for the subscriber;
retrieving the current call routing information for the subscriber from the storage device in dependence on the subscriber having left the area; and
connecting the incoming call to the subscriber using the current call routing information.

7. The method according to claim 6, wherein contact details for the storage device are included in the retained contact data.

8. The method according to claim 6, wherein the storage device is the home location register of the subscriber.

9. The method according to claim 6, wherein determining if the incoming call is expected for the subscriber includes determining if a mobile station roaming number has been allocated to the subscriber.

10. An apparatus for routing calls in a mobile communication network using contact data for a subscriber of the mobile communication network, comprising:
a storage device that stores contact data for subscribers of a mobile network located within an area served by a mobile switching centre (MSC);
a receiver that receives confirmation at the MSC that a subscriber has left the area;
an updating device that updates the contact data to identify that the subscriber has left the area; and
a retaining device that retains at least part of the contact data, the retained part of the contact data containing call forwarding details for the subscriber;
a determining device that determines if an incoming call is expected for the subscriber after receiving confirmation that the subscriber has left the area, wherein the at least part of the contact data is retained in dependence on the incoming call being expected for the subscriber; and
a call routing device that uses the retained part of the contact data to forward to the subscriber the incoming call that arrives at the MSC but which is received by the MSC after the subscriber has left the area.

11. The apparatus according to claim 10, wherein the determining device determines if a mobile station roaming number has been allocated to the subscriber.

12. An apparatus for connecting a call to a subscriber of a mobile communications network at a mobile switching centre (MSC), comprising:
a receiver that receives at a MSC a request to connect an incoming call to a subscriber;
a first determining device that determines whether the subscriber has left an area served by the MSC;
a retaining apparatus that retains, after the subscriber has left the area, contact data containing call forwarding details for the subscriber;
a retrieving device that retrieves call forwarding details for the subscriber from retained contact data for the subscriber in dependence on the subscriber having left the area;
a second determining device that determines if the incoming call is expected for the subscriber after receiving confirmation that a subscriber has left the area, wherein at least part of the contact data is retained in dependence on the incoming call being expected for the subscriber; and a connecting device that connects the incoming call using the call forwarding details.

13. The apparatus according to claim 12, wherein the request includes a mobile station roaming number associated with a subscriber and wherein the first determining device that determines whether the subscriber has left the area includes an identifying device that identifies whether the mobile station roaming number included in the request is allocated to the subscriber and whether the subscriber is identified as having left the area.

14. The apparatus according to claim 12, wherein the determining device determines if a mobile station roaming number has been allocated to the subscriber.

15. An apparatus for connecting a call to a subscriber of mobile communication network at a mobile switching centre (MSC), comprising:

a receiver that receives at a MSC a request to connect an incoming call to a subscriber;

a first determining device that determines whether the subscriber has left an area served by the MSC;

a retaining apparatus that retains, after the subscriber has left the area, contact data containing call forwarding details for the subscriber;

a retrieving device that retrieves current call routing information for the subscriber from a storage device in dependence on the subscriber having left the area; and a second determining device that determines if the incoming call is expected for the subscriber after receiving confirmation that a subscriber has left the area, wherein at least part of the contact data is retained in dependence on the incoming call being expected for the subscriber;

a connecting device that connects the incoming call to the subscriber using the current call routing information.

16. The apparatus according to claim 15, wherein contact details for the storage device are included in the retained contact data.

17. The apparatus according to claim 15, wherein the storage device is the home location register of the subscriber.

18. The apparatus according to claim 15, wherein the determining device determines if a mobile station roaming number has been allocated to the subscriber.

* * * * *